United States Patent
Lee et al.

(10) Patent No.: US 10,042,487 B2
(45) Date of Patent: Aug. 7, 2018

(54) TOUCH PANELS AND METHODS OF MANUFACTURING TOUCH PANELS

(71) Applicant: SAMSUNG DISPLAY CO., LTD., Yongin, Gyeonggi-Do (KR)

(72) Inventors: Byeong-Jin Lee, Suwon-si (KR); Sung-Ku Kang, Suwon-si (KR); Jung-Yun Kim, Cheonan-si (KR); Jee-Hun Lim, Seongnam-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 394 days.

(21) Appl. No.: 14/527,399

(22) Filed: Oct. 29, 2014

(65) Prior Publication Data

US 2015/0227235 A1   Aug. 13, 2015

(30) Foreign Application Priority Data

Feb. 10, 2014   (KR) .................. 10-2014-0014714

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 2203/04103* (2013.01); *G06F 2203/04107* (2013.01)

(58) Field of Classification Search
CPC ................. G06F 3/041; G06F 3/044; G06F 2203/04103; G06F 2203/04107
USPC ........ 345/173–178; 178/18.01; 257/355–360; 349/40
See application file for complete search history.

(56) References Cited

U.S. PATENT DOCUMENTS

| 8,497,845 | B2 | 7/2013 | Wang et al. | |
|---|---|---|---|---|
| 2008/0099885 | A1* | 5/2008 | You | H01L 24/06 257/659 |
| 2009/0262094 | A1 | 10/2009 | Lin | |
| 2009/0262095 | A1* | 10/2009 | Kinoshita | G06F 3/044 345/174 |
| 2010/0328254 | A1* | 12/2010 | Niga | G06F 3/044 345/174 |
| 2011/0057887 | A1* | 3/2011 | Lin | G06F 3/044 345/173 |
| 2011/0310033 | A1* | 12/2011 | Liu | G06F 3/044 345/173 |
| 2012/0075218 | A1 | 3/2012 | Lin et al. | |
| 2012/0075257 | A1 | 3/2012 | Choi et al. | |
| 2012/0081300 | A1* | 4/2012 | Chan | G06F 3/044 345/173 |

(Continued)

FOREIGN PATENT DOCUMENTS

JP   2013-037484   2/2013
KR   10-2013-0067094   6/2013

*Primary Examiner* — Stacy Khoo
(74) *Attorney, Agent, or Firm* — F. Chau & Associates, LLC

(57) ABSTRACT

A touch panel includes a plurality of sensing electrodes, a plurality of wirings and an electrostatic discharge pattern. The plurality of sensing electrodes is disposed on a substrate. The plurality of wirings extends from the plurality of sensing electrodes. A bottom surface of the plurality of wirings has the same height as a bottom surface of the plurality of sensing electrodes. The electrostatic discharge pattern is electrically connected to the plurality of wirings.

24 Claims, 9 Drawing Sheets

(56) References Cited

U.S. PATENT DOCUMENTS

| | | | |
|---|---|---|---|
| 2012/0098762 A1 | 4/2012 | Kim et al. | |
| 2012/0105343 A1 | 5/2012 | Lee et al. | |
| 2012/0169630 A1* | 7/2012 | Chou | G06F 3/0416 345/173 |
| 2012/0182230 A1* | 7/2012 | Wang | G06F 3/044 345/173 |
| 2013/0050104 A1* | 2/2013 | Lee | G06F 3/0418 345/173 |
| 2013/0140061 A1* | 6/2013 | Lim | G06F 3/044 174/255 |
| 2013/0163127 A1 | 6/2013 | Chu et al. | |
| 2013/0168837 A1 | 7/2013 | Kato et al. | |
| 2013/0170080 A1 | 7/2013 | Chen | |
| 2014/0071065 A1* | 3/2014 | Kung | G06F 3/041 345/173 |
| 2014/0092519 A1* | 4/2014 | Yang | H05F 3/04 361/220 |
| 2014/0168536 A1* | 6/2014 | Guo | G06F 3/044 349/12 |
| 2014/0361400 A1* | 12/2014 | Gan | H01L 23/5252 257/530 |

* cited by examiner

TOUCH PANELS AND METHODS OF MANUFACTURING TOUCH PANELS

CROSS REFERENCE TO RELATED APPLICATION

This application claims priority under 35 USC § 119 to Korean Patent Application No. 2014-0014714 filed on Feb. 10, 2014 in the Korean Intellectual Property Office (KIPO), the disclosures of which are herein incorporated by reference in their entireties.

TECHNICAL FIELD

Exemplary embodiments of the present invention relate to touch panels, and more particularly, to touch panels and methods of manufacturing touch panels.

DISCUSSION OF THE RELATED ART

A touch panel is a device capable of receiving information by converting a touch of an object into an electrical signal. Touch panels may be classified as a resistive type touch panel, a capacitive type touch panel, an electromagnetic type touch panel, a surface acoustic wave (SAW) type touch panel, or an infrared type touch panel.

While manufacturing the touch panel or using the touch panel, an electrostatic current may occur in the touch panel. The electrostatic current may break down at a portion where the sensing electrode and the wiring directly contact each other.

SUMMARY

Exemplary embodiments of the present invention provide a touch panel having an increased reliability.

Exemplary embodiments of the present invention provide a method of manufacturing a touch panel having an increased reliability.

According to an aspect of exemplary embodiments of the present invention, a touch panel is provided. The touch panel includes a plurality of sensing electrodes, a plurality of wirings and an electrostatic discharge pattern. The plurality of sensing electrodes is disposed on a substrate. The plurality of wirings extends from the plurality of sensing electrodes. A bottom surface of the plurality of wirings has the same height as a bottom surface of the plurality of sensing electrodes. The electrostatic discharge pattern is electrically connected to the plurality of wirings.

In exemplary embodiments of the present invention, the touch panel may further include an insulation layer pattern disposed between the electrostatic discharge pattern and the sensing electrodes. The electrostatic discharge pattern may include a first end portion directly contacting the wirings and a second end portion overlapping the sensing electrodes.

In exemplary embodiments of the present invention, the second end portion of the electrostatic discharge pattern may be separated from the wirings or the sensing electrodes.

In exemplary embodiments of the present invention, the electrostatic discharge pattern may be disposed adjacent to a portion where the sensing electrodes directly contact the wirings.

In exemplary embodiments of the present invention, a distance between the electrostatic discharge pattern and an upper edge of the sensing electrode may be adjusted.

In exemplary embodiments of the present invention, the sensing electrodes and the wirings may include a plurality of metal nanowires. The electrostatic discharge pattern may include a first conductive pattern and a second conductive pattern which are stacked sequentially.

In exemplary embodiments of the present invention, the sensing electrodes and the wirings may include a plurality of silver (Ag) nanowires. An electrical resistance of the first conductive pattern may be lower than an electrical resistance of the second conductive pattern. An oxidation resistant of the second conductive pattern may be higher that an oxidation resistant of the first conductive pattern.

In exemplary embodiments of the present invention, the first conductive pattern may include copper (Cu), and the second conductive pattern may include titanium (Ti).

In exemplary embodiments of the present invention, the plurality of wirings may have a first width. The electrostatic discharge pattern may have a second width. The second width may be smaller than the first width.

In exemplary embodiments of the present invention, the first width may be in a range of twice to ten times the second width.

In exemplary embodiments of the present invention, the substrate may include a first region and a second region surrounding at least one side of the first region. The sensing electrodes may be disposed in the first region.

In exemplary embodiments of the present invention, the wirings may be disposed in the first region and the second region. The wirings may have a first width in the first region, and a third width in the second region. The first width may be smaller than the third width.

In exemplary embodiments of the present invention, the touch panel may further include a pad portion disposed in the second region. The second region may surround one side of the first region.

In exemplary embodiments of the present invention, the sensing cells may be arranged in a first direction and a second direction that may be parallel to a top surface of the substrate. The wirings may extend along the first direction in the first region.

In exemplary embodiments of the present invention, the touch panel may further include an opposing electrode disposed on the substrate. The opposing electrode may have a planar shape such that the opposing electrode does not overlap the sensing electrodes.

In exemplary embodiments of the present invention, the opposing electrode may extend in the first direction, and a plurality of sensing electrodes may correspond to a single opposing electrode.

In exemplary embodiments of the present invention, a top surface and a bottom surface of the opposing electrode may have the same height as a top surface and a bottom surface of the sensing electrode.

In exemplary embodiments of the present invention, the sensing cells may be arranged in a first direction and a second direction that is parallel to a top surface of the substrate. The wirings may extend along an oblique direction inclined with respect to the first direction in the first region.

In exemplary embodiments of the present invention, a plurality of electrostatic discharge patterns may correspond to single wiring.

According to an aspect of exemplary embodiments of the present invention, a method of manufacturing a touch panel is provided. In the method, sensing electrodes and wirings extending from the sensing electrodes are formed on a substrate. An insulation layer pattern is formed to partially overlap the sensing electrodes and the wirings. An electrostatic discharge pattern is formed on the insulation layer pattern. The electrostatic discharge pattern contacts the wirings through a contact hole penetrating the insulation layer pattern.

In exemplary embodiments of the present invention, forming the electrostatic discharge pattern may include forming a first conductive layer and a second conductive layer sequentially and partially removing the first conductive layer and the second conductive layer to form a first conductive pattern and the second conductive pattern. The first conductive layer and the second conductive layer may cover the sensing electrodes and the wirings. The first conductive layer and the second conductive layer each have an etch selectivity with respect to the sensing electrodes and the wirings.

In exemplary embodiments of the present invention, forming the sensing electrodes and the wirings includes forming an opposing electrode simultaneously. The opposing electrode may have a planar shape such that the opposing electrode does not overlap the sensing electrodes.

According to exemplary embodiments of the present invention, an electrostatic discharge pattern may have a second width W2 which may be smaller than a first width W1 of wirings. An electrostatic current moving the wirings may be discharged into the electrostatic discharge pattern. For example, an electrostatic damage or an electrostatic breakdown may be induced to occur at an end portion of the electrostatic discharge pattern. Therefore, the electrostatic discharge pattern may prevent the electrostatic damage or the electrostatic breakdown between the sensing electrodes and the wirings.

BRIEF DESCRIPTION OF THE DRAWINGS

Example embodiments can be understood in more detail from the following description taken in conjunction with the accompanying drawings, in which.

DETAILED DESCRIPTION OF THE DRAWINGS

Figure 1:
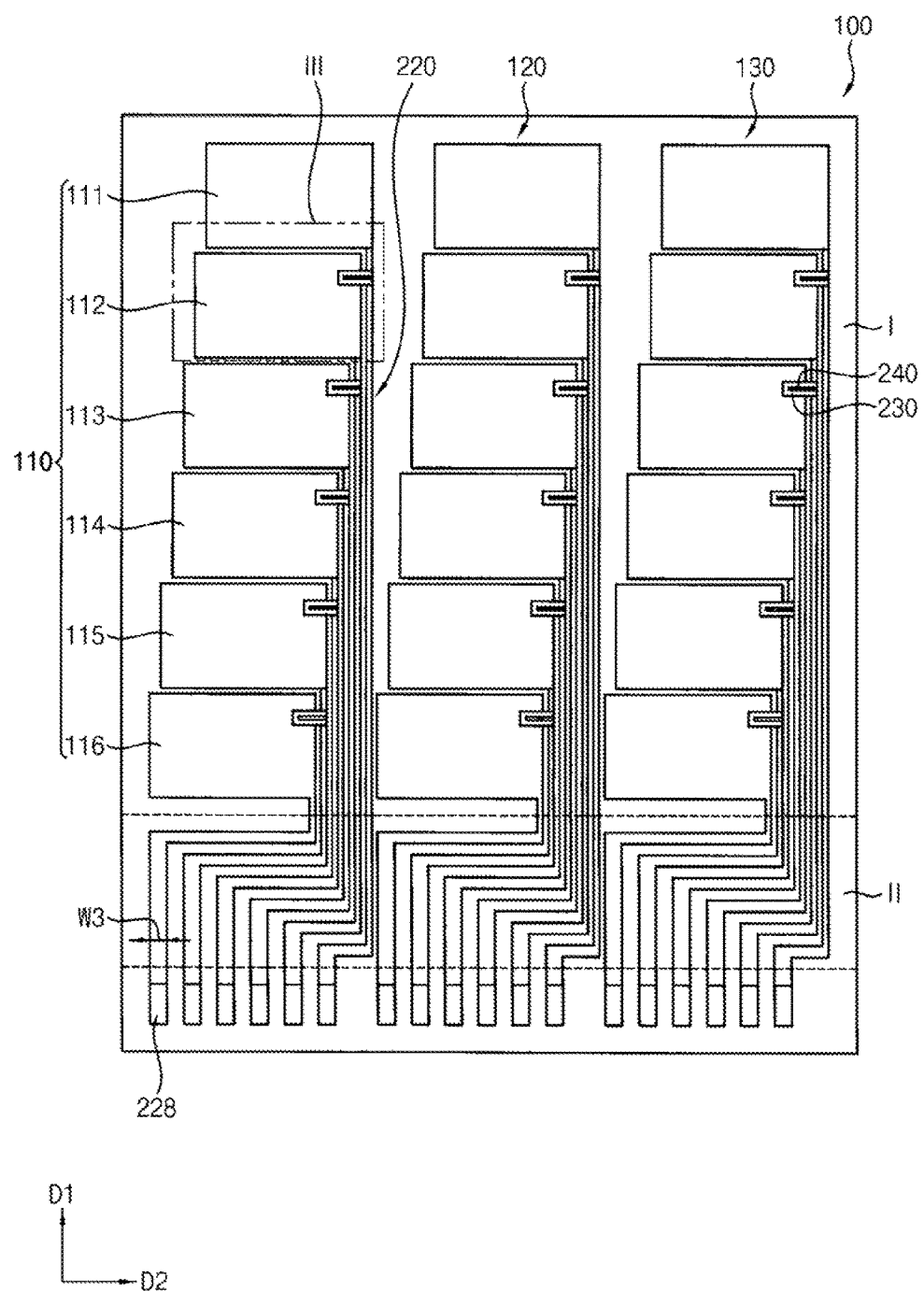
FIG. 1 is a plan view illustrating a touch panel in accordance with exemplary embodiments of the present invention.

Exemplary embodiments of the present invention are described more fully hereinafter with reference to the accompanying drawings. The invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. Like or similar reference numerals may refer to like or similar elements throughout.

The terminology used herein is for the purpose of describing particular exemplary embodiments only and is not intended to be limiting of the invention.

Exemplary embodiments of the present invention are described herein with reference to schematic illustrations of idealized examples and intermediate structures of the invention. As such, variations from the shapes of the illustrations as a result, for example, of manufacturing techniques and/or tolerances, may be expected. Thus, exemplary embodiments of the present invention should not be construed as limited to the particular shapes of regions illustrated herein but are to include deviations in shapes that result, for example, from manufacturing.

Figure 2:
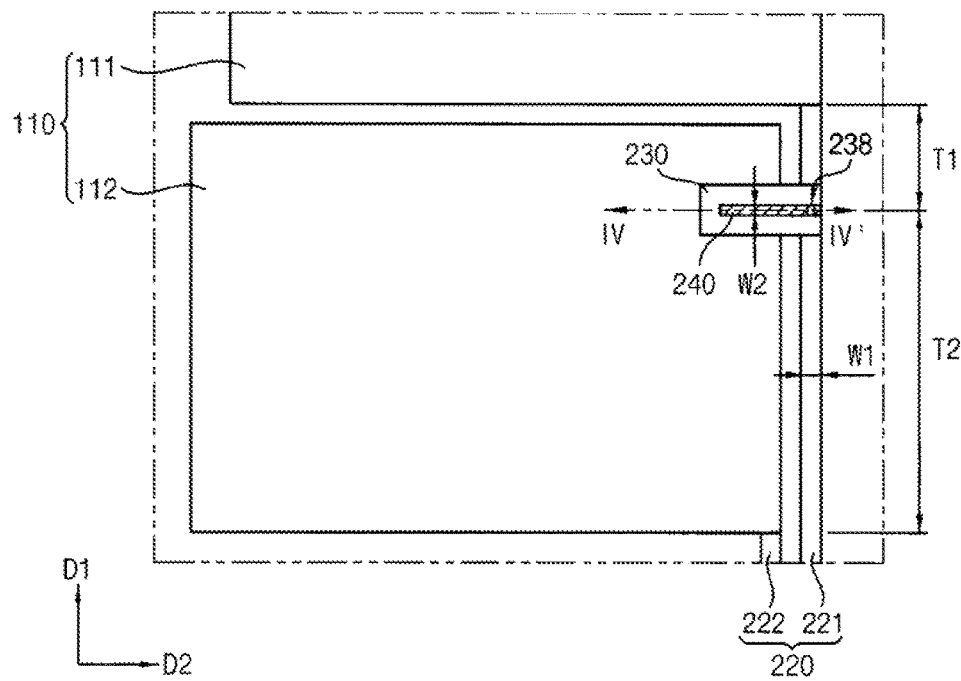
FIG. 2 is a plan view illustrating region III of FIG. 1 in accordance with exemplary embodiments of the present invention.
Figure 3:
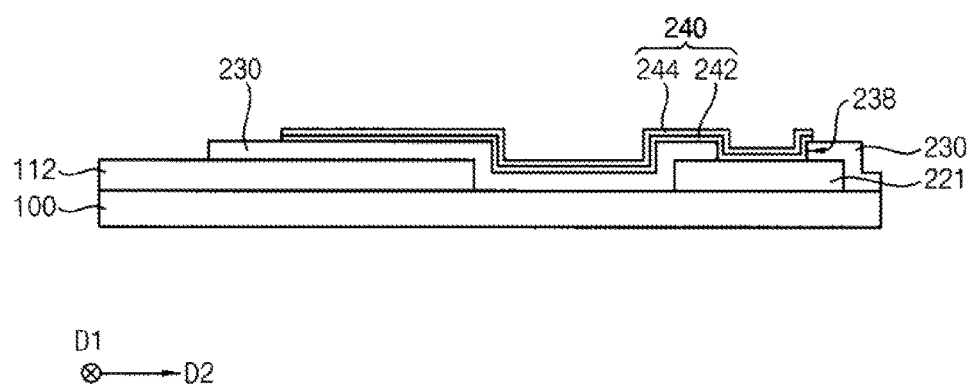
FIG. 3 is a cross sectional view cut along a line IV-IV' in FIG. 2 in accordance with exemplary embodiments of the present invention.

FIG. 1 is a plan view illustrating a touch panel in accordance with exemplary embodiments of the present invention. FIG. 2 is a plan view illustrating region III of FIG. 1 in accordance with exemplary embodiments of the present invention. FIG. 3 is a cross sectional view cut along a line IV-IV' in FIG. 2 in accordance with exemplary embodiments of the present invention.

Referring to FIGS. 1 to 3, the touch panel in accordance with exemplary embodiments of the present invention may include a substrate 100, a plurality of sensing electrodes 111 to 116, a plurality of wirings 220 and a pad portion 228. The touch panel may further include an electrostatic discharge (ESD) pattern 240 electrically connected to each of the wirings 220.

The substrate 100 may include a transparent insulation substrate. For example, the substrate 100 may include a glass substrate, a quartz substrate, a transparent resin substrate, etc.

The substrate 100 may be divided into a first region I and a second region II. In exemplary embodiments of the present invention, the first region I may be a sensing region in which the sensing electrodes 111 to 116 may be located, and the second region II may be a peripheral region in which the wirings 220 and the pad portion 228 may be located. For example, the first region I may be exposed to a user of the touch panel, and the second region II may be covered by a bezel. The second region II may surround at least one side of the first region I. According to exemplary embodiments of the present invention, the second region II may surround one side of the first region I as illustrated in FIG. 1.

The plurality of sensing electrodes 111 to 116 may be disposed in the first region I on the substrate 100. In exemplary embodiments of the present invention, the plurality of sensing electrodes 111 to 116 may be arranged in a first direction D1 substantially parallel to a top surface of the substrate 100. Therefore, the plurality of sensing electrodes 111 to 116 may constitute a first sensing electrode column 110. Further, the first sensing electrode column 110, a second sensing electrode column 120 and a third sensing electrode column 130 may be arranged in a second direction D2 substantially perpendicular to the first direction D1. Therefore, the plurality of sensing electrode column 110, 120 and 130 may constitute a sensing electrode array. For example, the sensing electrode array may include a plurality of sensing electrode arranged in the first direction D1 and the second direction D2.

In exemplary embodiments of the present invention, the plurality of sensing electrodes 111 to 116 may have a rectangular shape extending the second direction D2 as illustrated in FIGS. 1 and 2. However, the present invention need not be limited thereto. For example, the plurality of sensing electrodes 111 to 116 may have different shapes.

The plurality of sensing electrodes 111 to 116 may be arranged in a predetermined manner. In exemplary embodiments of the present invention, each of the sensing electrodes 111 to 116 may have the same length in the second direction D2. Further, each of the sensing electrodes 111 to 116 may be shifted in the second direction D2, gradually. For example, edges of the second electrodes 111 to 116 may be arranged in an oblique direction. Alternatively, each of the sensing electrodes 111 to 116 may have different lengths in the second direction D2.

The plurality of wirings 220 may be disposed in the first region I and the second region II on the substrate 100. The plurality of wirings 220 may electrically connect the plurality of sensing electrodes 111 to 116 and the pad portion 228. Each of the wirings 220 may be electrically isolated from each other, and may be arranged to correspond to each of the sensing electrodes 111 to 116. For example, a first wiring 221 may be electrically connected to the first sensing electrode 111, and a second wiring 222 may be electrically connected to the second sensing electrode 112, etc.

In exemplary embodiments of the present invention, each of the wirings 220 may extend along the first direction D1 in the first region I. Each of the wirings 220 may directly contact a lower edge of each sensing electrodes 111 to 116. Further, the wirings 220 electrically connected to the sensing electrode 111 to 116 constituting one sensing electrode column 110 may be disposed adjacent to each other.

Each of the wirings 220 may have a first width W1 in the second direction D2. The first width W1 may be determined depending on electrical resistance and area occupied by the wirings 220. In exemplary embodiments of the present invention, the first width W1 may be in a range of about 10μ to about 50 μm. For example, the first width W1 may be about 30 nm.

In exemplary embodiments of the present invention, the plurality of wirings 220 may extend from the first region I to the second region II in the first direction D1, so that the second region II may surround one side of the first region I. As illustrated in FIG. 1, the second region II for receiving the wirings 220 need not be disposed at a left side or a right side of the first region I. Therefore, area of the second region II which need not be exposed to the user may decrease.

The plurality of wirings 220 may extend along the first direction D1 and the second direction D2 in the second region II, and may contact the pad portion 228. Therefore, each of the sensing electrodes 111 to 116 may be electrically connected to the pad portion 228 through each of the wirings 220.

In exemplary embodiments of the present invention, each of the wirings 220 may have a third width W3 in the second region II, and the third width W3 may be larger than the first width W1. For example, the third width W3 may be in a range of twice to five times the first width W1. For example, the plurality of sensing electrodes 111 to 116 need not be disposed in the second region II, so that the plurality of wirings 220 having an enlarged width W3 may be packed in the second region II. As the plurality of wirings 220 may have the enlarged width W3, electrical resistance of the wirings 220 may decrease. Further, a contact margin between the wirings 220 and the pad portion 228 may increase.

The sensing electrodes 111 to 116 and the wirings 220 may be formed by the same patterning process. For example, the sensing electrodes 111 to 116 and the wirings 220 may include the same material, and may have the same top surface and the same bottom surface. In this case, a minimum width of the sensing electrodes 111 to 116 and the wirings 220 may be the first width W1. For example, the sensing electrodes 111 to 116 and the wirings 220 may be formed by a patterning process having a resolution corresponding to the first width W1.

In exemplary embodiments of the present invention, the sensing electrodes 111 to 116 and the wirings 220 may include a plurality of metal nanowires. The plurality of metal nanowires may be arranged randomly or may be arranged in a predetermined direction.

In an exemplary embodiment of the present invention, the metal nanowires may have a width of about 10 nm to about 50 nm, and may have a length of about 1 μm to about 10 μm. For example, the metal nanowires may include silver (Ag) nanowires. The metal nanowires may have a relatively large length, and may be arranged to form the network, so that the sensing electrodes 111 to 116 and the wirings 220 may have a relatively small electrical resistance and a relatively large light transmittance. Further, the metal nanowires may have a relatively large ductility. Even in the event that the touch panel is bent, the sensing electrodes 111 to 116 and the wirings 220 can remain unbroken.

Referring now to FIGS. 2 and 3, a plurality of insulation layer patterns 230 may be disposed to correspond to the sensing electrodes 111 to 116 and the wirings 220.

In exemplary embodiments of the present invention, the insulation layer patterns 230 may have a rectangular shape extending in the second direction D2. In this case, one end portion of the insulation layer pattern 230 may overlap one of the wirings 220, and another end portion of the insulation layer pattern 230 may overlap one of the sensing electrodes 111 to 116. For example, the insulation layer pattern 230 may partially overlap the first wiring 221 as illustrated in FIG. 2, and may partially overlap a second sensing electrode 112 which may be disposed adjacent to the first wiring 221 and might not be electrically connected to the first wiring 221. The insulation layer patterns 230 may have a predetermined thickness, such that the insulation layer pattern 230 may electrically isolate the sensing electrodes 111 to 116 from the electrostatic discharge pattern 240. For example, the insulation layer pattern 230 may have a thickness in a range of about 2 μm to about 5 μm.

The electrostatic discharge pattern 240 may be disposed in the first region I on the insulation layer pattern 230. In exemplary embodiments of the present invention, a plurality of electrostatic discharge patterns 240 may correspond to the plurality of insulation layer patterns 230.

In example embodiments, the electrostatic discharge pattern 240 may have a rectangular shape extending the second direction D2 as illustrated in FIG. 2. In this case, the electrostatic discharge pattern 240 may have a second width W2 in the first direction D1, and the second width W2 may be smaller than the first width W1 of the wirings 220. In exemplary embodiments of the present invention, the first width W1 of the wirings 220 may be in a range of twice to ten times the second width W2 of the electrostatic discharge pattern 240. For example, the second width W2 may be in a range of about 1 μm to about 10 μm.

A first end portion 245 of the electrostatic discharge pattern 240 may be electrically connected to the wirings 220 through a contact hole 238 penetrating the insulation layer pattern 230, and a second end portion 246 of the electrostatic discharge pattern 240 may overlap one of the sensing electrodes 111 to 116. Particularly, the second end portion 246 of the electrostatic discharge pattern 240 might not directly contact a conductive material. For example, the electrostatic discharge pattern 240 may be electrically connected to the first wiring 221, and may overlap the second sensing electrode 112.

Referring to FIG. 3, the electrostatic discharge pattern 240 may have a multi layer structure including a first conductive pattern 242 and a second conductive pattern 244. In exemplary embodiments of the present invention, the first conductive pattern 242 may include a metal such as aluminum or copper, which may have a relatively small electrical resistance, and the second conductive pattern 244 may include a metal such as titanium or nickel which may have a relatively high oxidation resistant. When the first conductive pattern 242 includes copper and the second conductive pattern 244 includes titanium, the electrostatic discharge pattern 240 may have an etching selectivity with respective to Ag nanowires of the sensing electrodes 111 to 116 and the wirings 220. Therefore, the sensing electrodes 111 to 116 and the wirings 220 might not be damaged during etching processes for forming the first conductive pattern 242 and the second conductive pattern 244.

The electrostatic discharge pattern 240 may be formed on the insulation layer pattern 230, and may include a material different from those of the sensing electrodes 111 to 116 and the wirings 220. Therefore, a patterning process for forming the electrostatic discharge pattern 240 may be performed separately from a patterning process for forming the sensing electrodes 111 to 116 and the wirings 220. The electrostatic discharge pattern 240 may be formed by the patterning process having a resolution corresponding to the second width W2 which may be smaller than the first width W1.

The electrostatic discharge pattern 240 may be disposed adjacent to a portion where the sensing electrodes 111 to 116 directly contact the wirings 220. When the electrostatic discharge pattern 240 overlaps the second sensing electrode 112, as illustrated in FIG. 2, a first distance T1 may be defined as a distance between the electrostatic discharge pattern 240 and an upper edge of the second sensing electrode 112, and a second distance T2 may be defined as a distance between the electrostatic discharge pattern 240 and a lower edge of the second sensing electrode 112. The first distance T1 may be smaller than the second distance T2. Therefore, the electrostatic discharge pattern 240 may prevent an electrostatic damage between the first wiring 221 and the first sensing electrode 111.

The electrostatic discharge pattern 240 may have the rectangular shape extending in the second direction D2, however present invention is not limited thereto. For example, the electrostatic discharge pattern 240 may extend in an oblique direction, or may be curved or bent. Alternatively, the electrostatic discharge pattern 240 may have a trapezoid shape or a triangle shape. In this case, a width of the electrostatic discharge pattern 240 may decrease, as a distance from the wirings 220 increases.

According to exemplary embodiments of the present invention, the electrostatic discharge pattern 240 may have the second width W2 which may be smaller than the first width W1 of the wirings 220, an electrostatic current moving the wirings 220 may be discharged into the electrostatic discharge pattern 240. For example, an electrostatic damage or an electrostatic breakdown may be induced to occur at an end portion of the electrostatic discharge pattern 240. Therefore, the electrostatic discharge pattern 240 may prevent the electrostatic damage or the electrostatic breakdown between the sensing electrodes 111 to 116 and the wirings 220. Accordingly, the sensing electrodes 111 to 116 and the corresponding wirings 220 might not be isolated by the electrostatic damage or the electrostatic breakdown.

Figure 4:
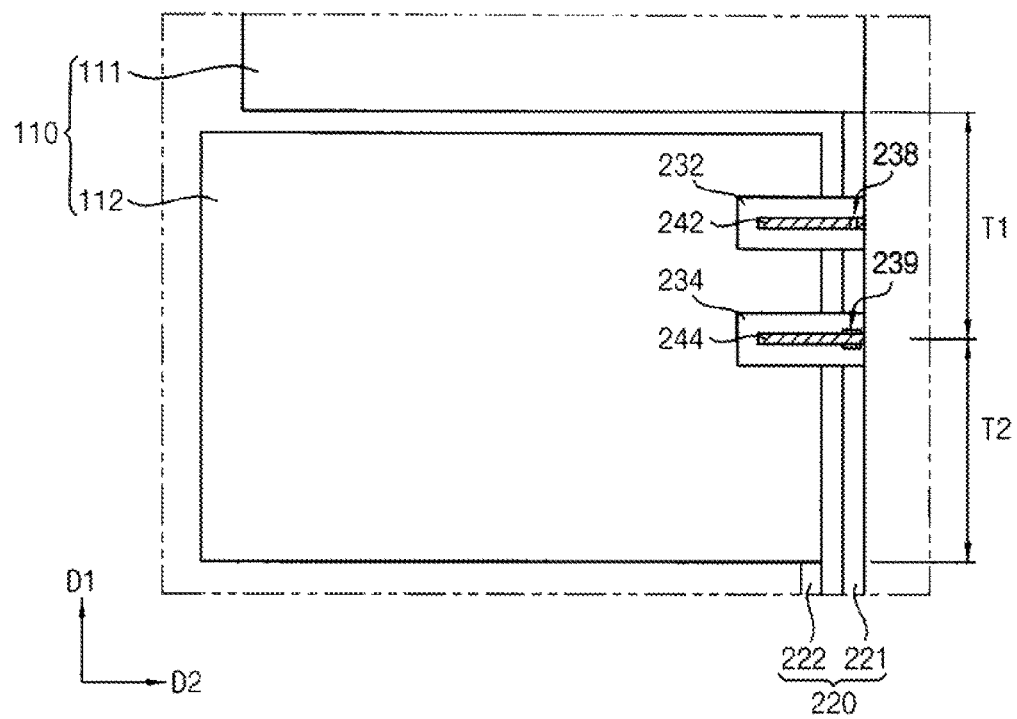
FIG. 4 is a plan view illustrating a portion of a touch panel in accordance with exemplary embodiments of the present invention.

FIG. 4 is a plan view illustrating a portion of a touch panel in accordance with exemplary embodiments of the present invention. The touch panel in FIG. 4 may be substantially the same as or similar to the touch panel in FIGS. 1 to 3 except for a first electrostatic discharge pattern 242 and a second electrostatic discharge pattern 244.

The sensing electrodes 111 and 112 may be disposed on a substrate. The sensing electrodes 111 and 112 may be arranged in a first direction D1 or a second direction D2. Therefore, a plurality of sensing electrodes 111 and 112 may be arranged in a matrix form to constitute a sensing electrode array.

A plurality of wirings 220 may be arranged to correspond to the sensing electrodes 111 and 112. For example, the plurality of wirings 220 may include a first wiring 221 electrically connected to the first sensing electrode 111 and a second wiring 222 electrically connected to the second sensing electrode 112. In this case, the plurality of wirings 220 may have a first width W1 in the second direction D2, and the first width W1 may be in a range of about 10 μm to about 50 μm.

The sensing electrodes 111 and 112 and the wirings 220 may be formed by the same patterning process. For example, the sensing electrodes 111 to 116 and the wirings 220 may include the same material, and may have the same top surface and the same bottom surface. In exemplary embodiments of the present invention, the sensing electrodes 111 and 112 and the wirings 220 may include a plurality of metal nanowires such as Ag nanowires.

A plurality of insulation layer patterns 232 and 234 may be disposed to correspond to the sensing electrodes 111 and 112 and the wirings 221 and 222. In exemplary embodiments of the present invention, a plurality of insulation layer patterns 232 and 234 may correspond to a single wiring 221.

In exemplary embodiments of the present invention, the insulation layer patterns 232 and 234 may have a rectangular shape extending in the second direction D2. Each of the insulation layer patterns 232 and 234 may overlap the first wirings 221 and the second sensing electrodes 112.

A plurality of electrostatic discharge patterns 242 and 244 may be disposed to correspond to the sensing electrodes 111 and 112 and the wirings 221 and 222. In exemplary embodiments of the present invention, a plurality of electrostatic discharge patterns 242 and 244 may correspond to single wiring 221.

In exemplary embodiments of the present invention, the electrostatic discharge patterns 242 and 244 may have a rectangular shape extending in the second direction D2. Each of the electrostatic discharge patterns 242 and 244 may overlap the first wirings 221 and the second sensing electrodes 112.

As illustrated in FIG. 4, first end portions of the electrostatic discharge patterns 242 and 244 may be electrically connected to the first wiring 221 through contact holes 238 and 239, and second end portions of the electrostatic discharge patterns 242 and 244 may be disposed to overlap the second sensing electrode 112. Further, the electrostatic discharge patterns 242 and 244 may have a second width W2 in the first direction D1. For example, the second width W2 may be in a range of about 1 μm to about 10 μm.

In exemplary embodiments of the present invention, the first electrostatic discharge pattern 242 and the second electrostatic discharge pattern 244 may be spaced apart from each other in the first direction D1. For example, the first electrostatic discharge pattern 242 may be disposed between the second electrostatic discharge pattern 244 and an upper edge of the second sensing electrode 112.

The first electrostatic discharge pattern 242 and the second electrostatic discharge pattern 244 may be disposed adjacent to a portion where the first sensing electrode 111 directly contacts the first wirings 221. For example, when the first electrostatic discharge pattern 242 and the second electrostatic discharge pattern 244 overlap the second sensing electrode 112 as illustrated in FIG. 2, a first distance T1 may be defined as a distance between the second electrostatic discharge pattern 244 and an upper edge of the second sensing electrode 112, and a second distance T2 may be defined as a distance between the second electrostatic discharge pattern 244 and a lower edge of the second sensing electrode 112. The first distance T1 may be smaller than the second distance T2. Therefore, the first electrostatic discharge pattern 242 and the second electrostatic discharge pattern 244 may prevent an electrostatic damage between the first wiring 221 and the first sensing electrode 111.

According to exemplary embodiments of the present invention, the first electrostatic discharge pattern 242 and the second electrostatic discharge pattern 244 may have the second width W2 which may be smaller than the first width W1 of the wirings 220, an electrostatic current moving the wirings 220 may be discharged into the first electrostatic discharge pattern 242 or the second electrostatic discharge pattern 244. For example, an electrostatic damage or an electrostatic breakdown may be induced to occur at an end portion of the first electrostatic discharge pattern 242 and the second electrostatic discharge pattern 244. Therefore, the first electrostatic discharge pattern 242 and the second electrostatic discharge pattern 244 may prevent the electrostatic damage or the electrostatic breakdown between the sensing electrodes 111 and 112 and the wirings 220. Accordingly, the sensing electrodes 111 and 112 and the corresponding wirings 220 might not be isolated by the electrostatic damage or the electrostatic breakdown.

Figure 5:
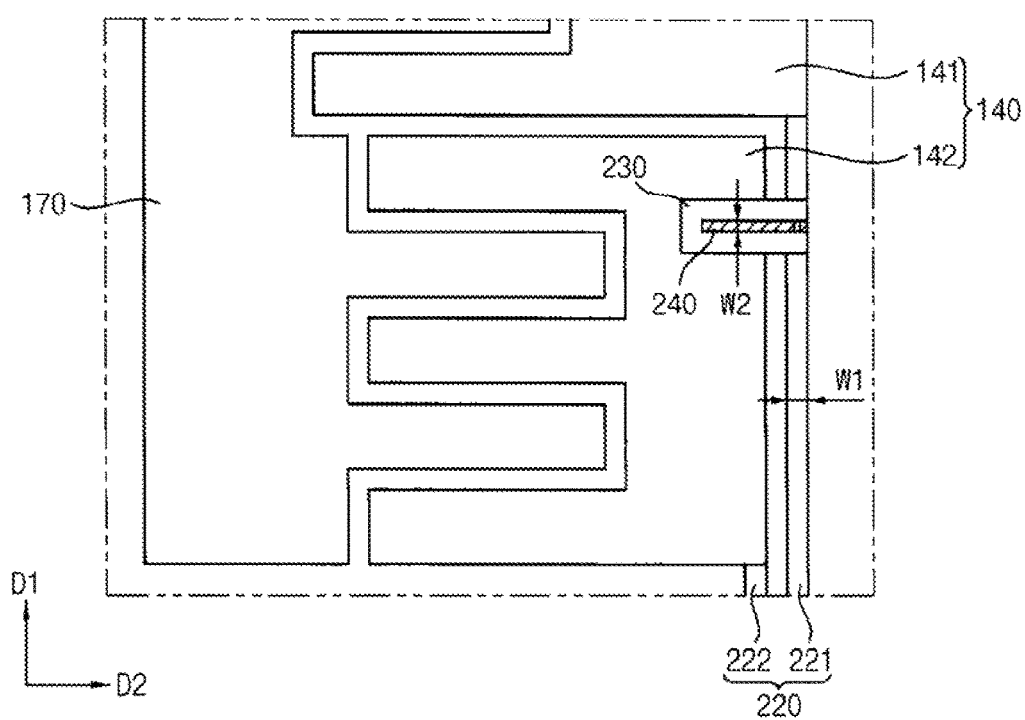
FIG. 5 is a plan view illustrating a portion of a touch panel in accordance with exemplary embodiments of the present invention.

FIG. 5 is a plan view illustrating a portion of a touch panel in accordance with exemplary embodiments of the present invention. The touch panel in FIG. 5 may be substantially the same as or similar to the touch panel in FIGS. 1 to 3 except for sensing electrodes 141 and 142 and an opposing electrode 170.

The sensing electrodes 141 and 142 may be disposed on a substrate, and may be arranged in a first direction D1 or a second direction D2. Therefore, a plurality of sensing electrodes 141 and 142 may be arranged in a matrix form to constitute a sensing electrode array. In exemplary embodiments of the present invention, each of sensing electrodes 141 and 142 may have an 'E' shape.

The opposing electrode 170 may extend in the first direction D1. The opposing electrode 170 may be disposed to correspond to the sensing electrodes 141 and 142. Further, a plurality of opposing electrodes 170 may be arranged in the second direction D2.

In an exemplary embodiment of the present invention, the opposing electrode 170 may be a dummy electrode which might not transfer an electrical signal. The opposing electrode 170 may compensate differences of dielectric permittivity and transmittance between one region where the sensing electrodes 141 and 142 are disposed and another region where the sensing electrodes 141 and 142 are not disposed.

In an exemplary embodiment of the present invention, the opposing electrode 170 may transfer an electrical signal. For example, the touch panel may detect a position of touching by observing a capacitance change between the sensing electrodes 141 and 142 and the opposing electrode 170.

A plurality of wirings 220 may be arranged to correspond to the sensing electrodes 141 and 142. For example, the plurality of wirings 220 may include a first wiring 221 electrically connected to the first sensing electrode 141 and a second wiring 222 electrically connected to the second sensing electrode 142. The plurality of wirings 220 may have a first width W1 in the second direction D1, and the first width W1 may be in a range of about 10 μm to about 50 μm.

The sensing electrodes 141 and 142, the opposing electrode 170 and the wirings 220 may be formed by the same patterning process. For example, the sensing electrodes 141 and 142, the opposing electrode 170 and the wirings 220 may include the same material, and may have the same top surface and the same bottom surface. In exemplary embodiments of the present invention, the sensing electrodes 141 and 142, the opposing electrode 170 and the wirings 220 may be disposed to not overlap each other.

According to exemplary embodiments of the present invention, the electrostatic discharge pattern 240 may have the second width W2 which may be smaller than the first width W1 of the wirings 220, an electrostatic current moving the wirings 220 may be discharged into the electrostatic discharge pattern 240.

Figure 6:
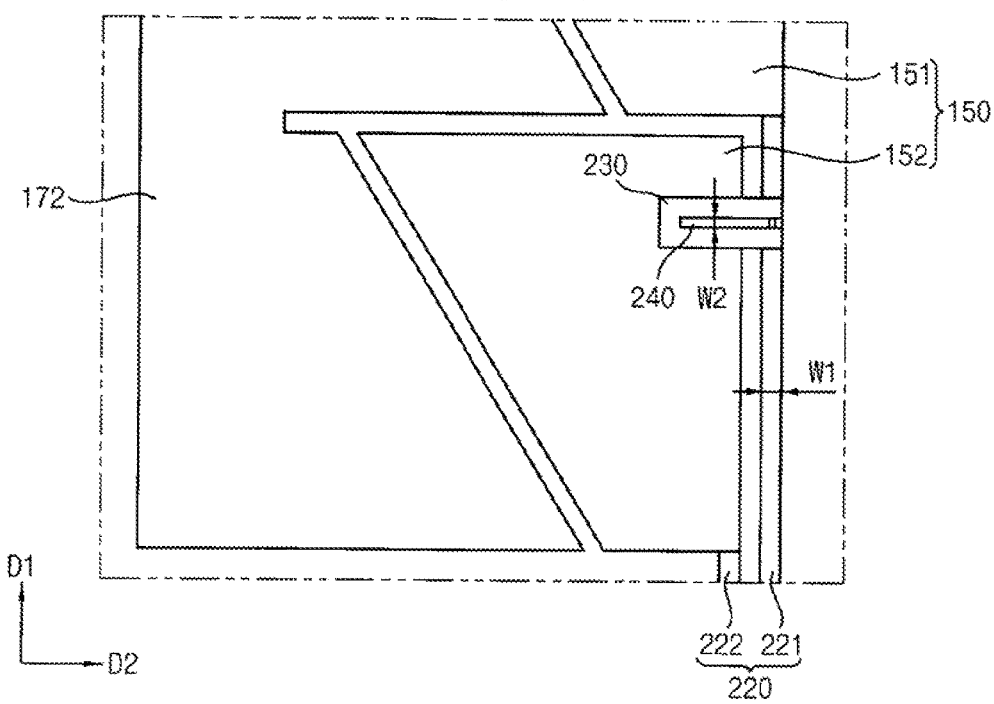
FIG. 6 is a plan view illustrating a portion of a touch panel in accordance with exemplary embodiments of the present invention.

FIG. 6 is a plan view illustrating a portion of a touch panel in accordance with exemplary embodiments of the present invention. The touch panel in FIG. 6 may be substantially the same as or similar to the touch panel in FIGS. 1 to 3 except for sensing electrodes 151 and 152.

Referring to FIG. 6, the sensing electrodes 151 and 152 may have a trapezoid shape including an upper edge and a lower edge that is parallel. However, the present invention is not limited thereto. For example, the sensing electrodes 151 and 152 may have different shapes. The opposing electrode 172 may be disposed to correspond to the sensing electrodes 151 and 152.

In an exemplary embodiment of the present invention, the opposing electrode 170 may be a dummy electrode which might not transfer an electrical signal. The opposing electrode 170 may compensate differences of dielectric permittivity and transmittance between one region where the sensing electrodes 141 and 142 are disposed and another region where the sensing electrodes 141 and 142 are not disposed.

Figure 7:
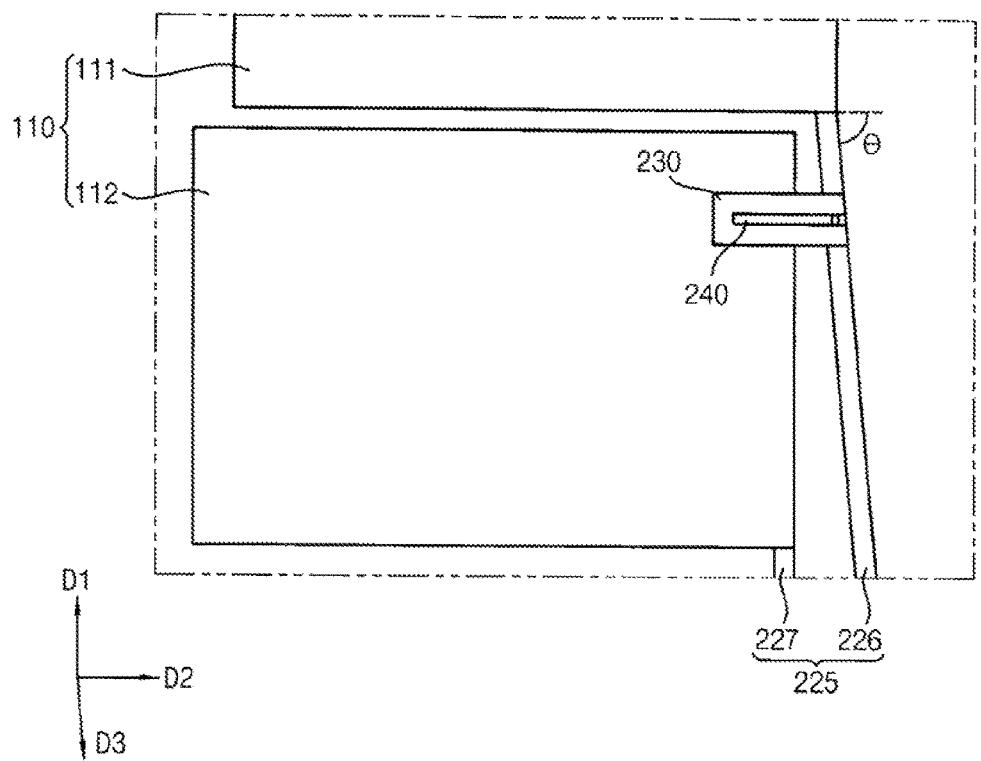
FIG. 7 is a plan view illustrating a portion of a touch panel in accordance with exemplary embodiments of the present invention.

FIG. 7 is a plan view illustrating a portion of a touch panel in accordance with exemplary embodiments of the present invention. The touch panel in FIG. 7 may be substantially the same as or similar to the touch panel in FIGS. 1 to 3 except for wirings 225.

Referring to FIG. 7, the wirings 225 may be electrically connected to the sensing electrodes 111 and 112. The wirings 225 may include a first wiring 226 and a second wiring 227. In exemplary embodiments of the present invention, the wirings 225 may extend in a third direction D3, and a first angle θ between a second direction D2 and the third direction may be in a range of about 45° to about 90°. As the wirings 225 extend in the oblique direction, a distance between the adjacent wirings 225 may increase. Therefore, a coupling phenomenon between the adjacent wirings 225 may be reduced.

Figure 8:
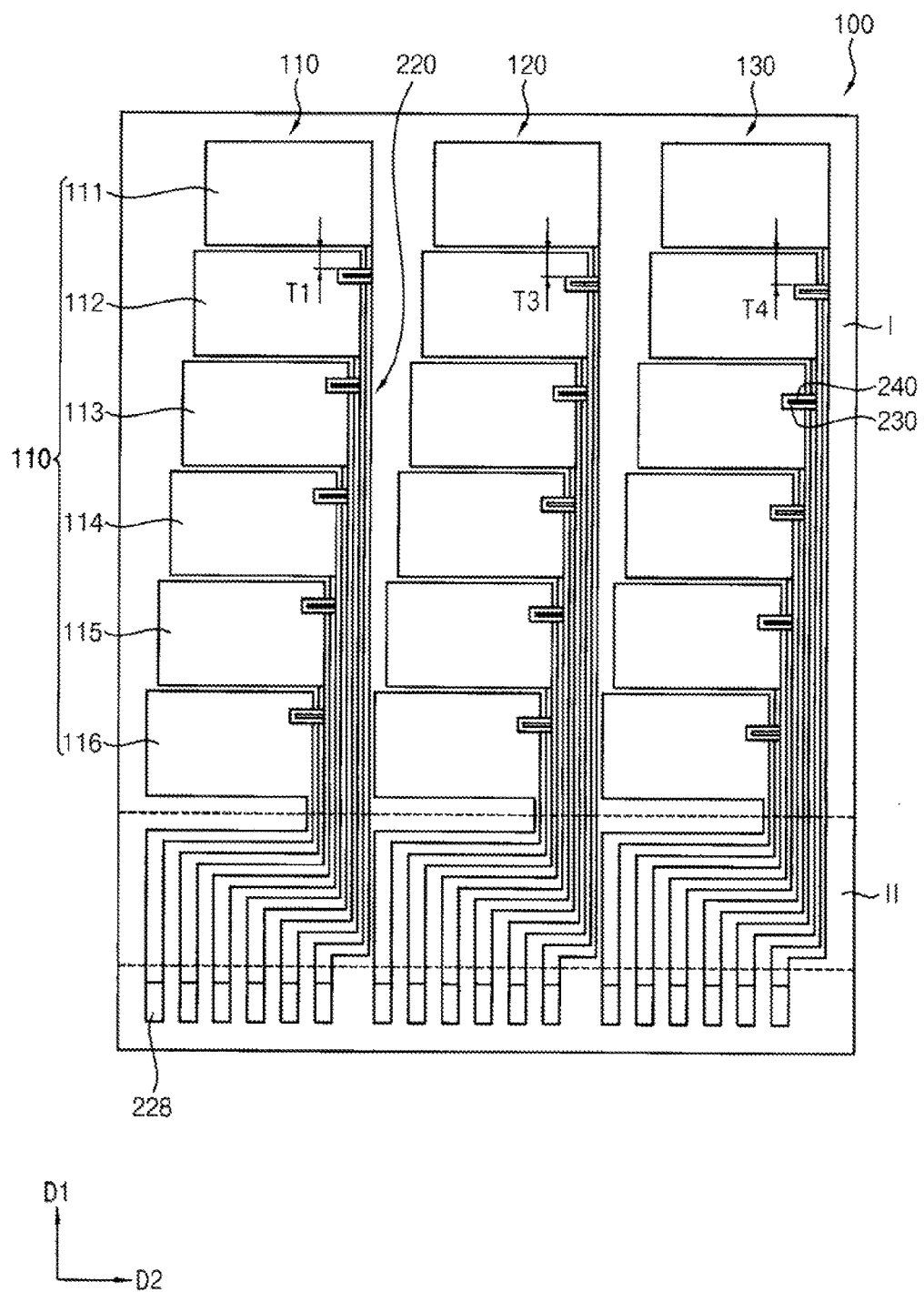
FIG. 8 is a plan view illustrating a touch panel in accordance with exemplary embodiments of the present invention.

FIG. 8 is a plan view illustrating a portion of a touch panel in accordance with exemplary embodiments of the present invention. The touch panel in FIG. 8 may be substantially the same as or similar to the touch panel in FIGS. 1 to 3 except for positions of electrostatic discharge patterns 240.

Referring to FIG. 8, the touch panel may include a substrate 100, a plurality of sensing electrodes 111 to 116, a plurality of wirings 220 and a pad portion 228. The touch panel may further include electrostatic discharge (ESD) patterns 240 electrically connected to each of the wirings 220.

The plurality of sensing electrodes 111 to 116 may be disposed in the first region I on the substrate 100. In exemplary embodiments of the present invention, the plurality of sensing electrodes 111 to 116 may be arranged in a first direction D1 substantially parallel to a top surface of the substrate 100. Therefore, the plurality of sensing electrodes 111 to 116 may constitute a first sensing electrode column 110. Further, the first sensing electrode column 110, a second sensing electrode column 120 and a third sensing electrode column 130 may be arranged in a second direction D2 substantially perpendicular to the first direction D1. Therefore, the plurality of sensing electrode column 110, 120 and 130 may constitute a sensing electrode array.

The wirings 220, the insulation layer patterns 230 and the electrostatic discharge pattern 240 may be substantially the same as or similar to those described with reference to FIGS. 1 to 3.

However, the positions of the electrostatic discharge pattern 240 may be adjusted. For example, a distance between each of the electrostatic discharge patterns 240 and an upper edge of corresponding sensing electrodes 111 to 116 may be determined differently. For example, a first distance T1 may be defined as a distance between the electrostatic discharge pattern 240 and an upper edge of the sensing electrode 112 in the first sensing electrode column 110, a third distance T3 may be defined as a distance between the electrostatic discharge pattern 240 and an upper edge of a sensing electrode in the second sensing electrode column 120, and a fourth distance T4 may be defined as a distance between the electrostatic discharge pattern 240 and an upper edge of the sensing electrode 112 in the third sensing electrode column 130. In this case, the first distance T1 may be different from the third distance T3 or the fourth distance T4.

The electrostatic discharge patterns 240 may include conductive patterns, so that there are differences of dielectric permittivity and transmittance between one region where the electrostatic discharge patterns 240 are disposed and another region where the electrostatic discharge patterns 240 are not disposed. If the electrostatic discharge patterns 240 may arranged regularly, a moiré pattern may be observed by the user.

According to exemplary embodiments of the present invention, the positions of the electrostatic discharge (ESD) patterns 240 may be adjusted, such that the moiré pattern might not be observed by the user.

FIGS. 9 to 15 are plan views and cross sectional views illustrating a method of manufacturing a touch panel in accordance with some exemplary embodiments of the present invention.

Figure 9:
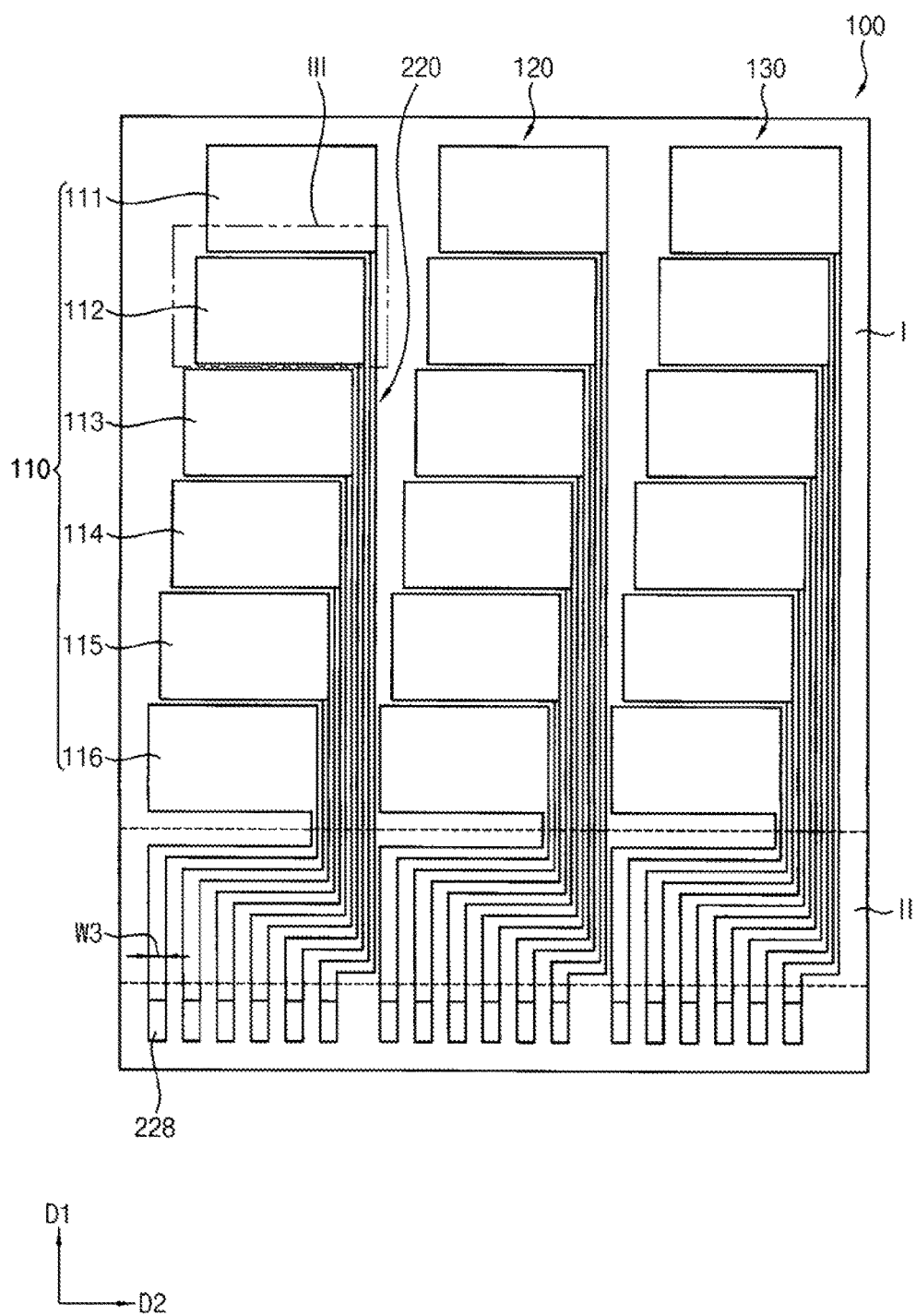
FIGS. 9 to 15 are plan views and cross sectional views illustrating a method of manufacturing a touch panel in accordance with exemplary embodiments of the present invention.
Figure 10:
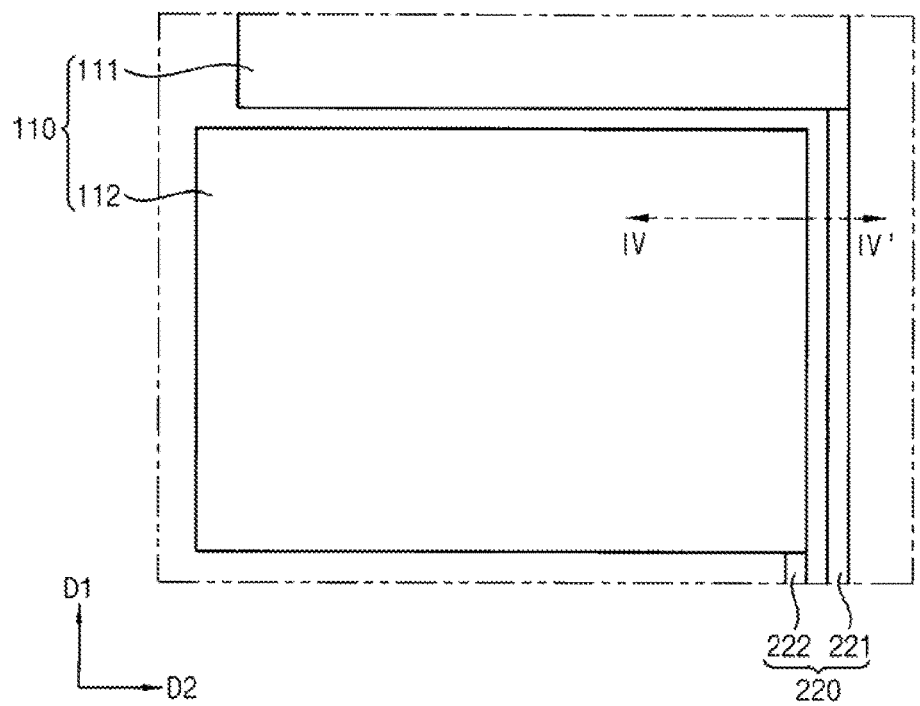
Figure 11:
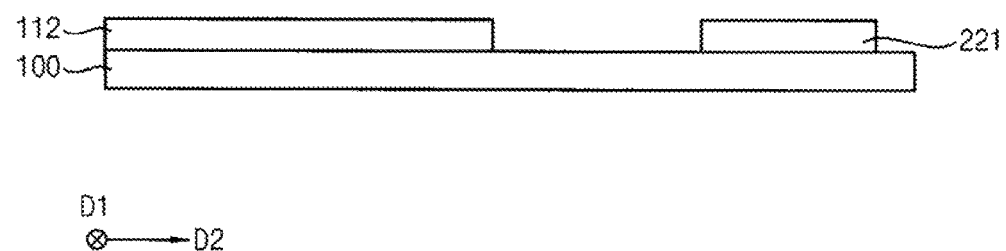
Figure 12:
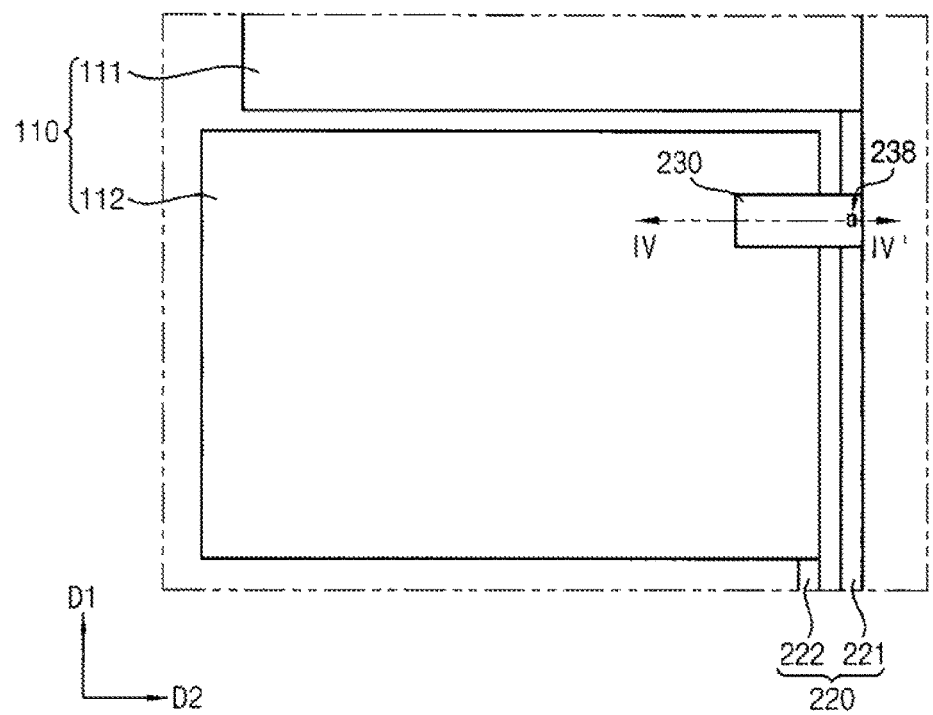
Figure 13:
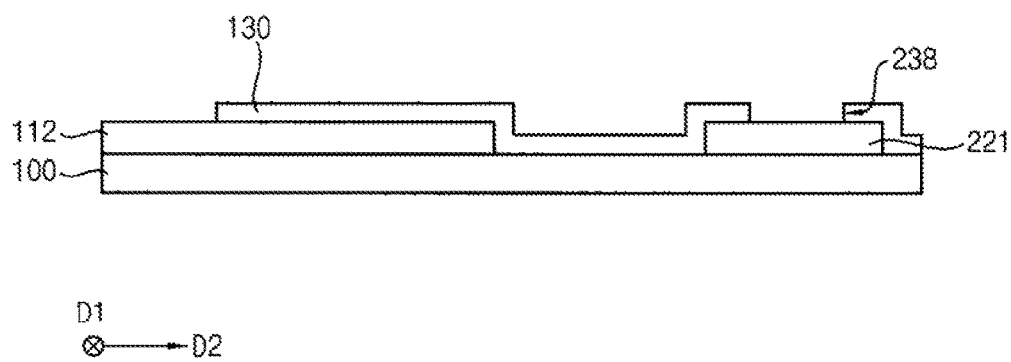
Figure 14:
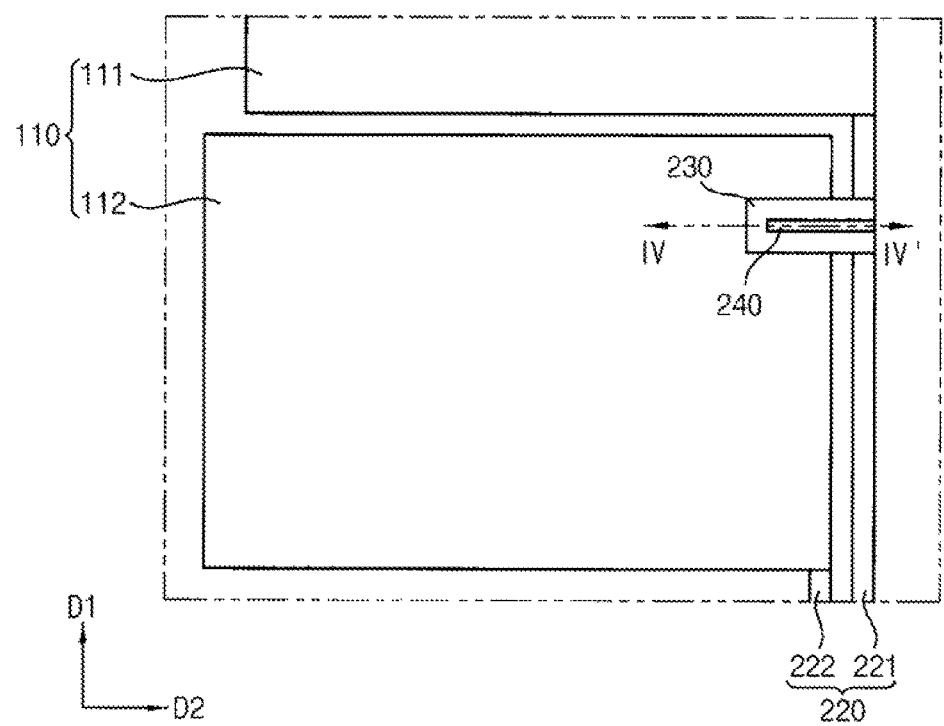
Figure 15:
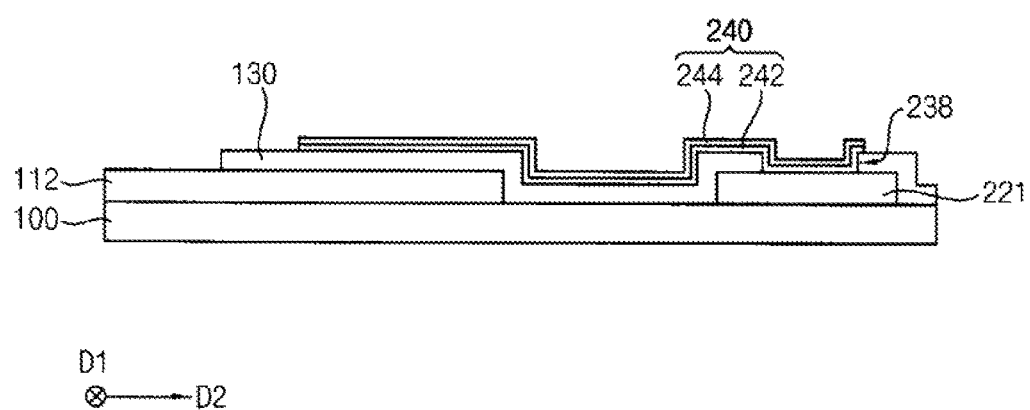

FIG. 9 is a plan view illustrating the method of manufacturing the touch panel in accordance with some exemplary embodiments of the present invention, FIGS. 10, 12 and 14 are plan views illustrating region III of FIG. 9 in accordance with some exemplary embodiments of the present invention, and FIGS. 11, 13 and 15 are cross sectional views cut along a line IV-IV' in FIGS. 10, 12 and 14 in accordance with some exemplary embodiments of the present invention.

Referring to FIGS. 9 to 11, a plurality of sensing electrodes 111 to 116 and wirings 220 may be formed on a substrate 100.

Particularly, a conductive electrode layer may be formed on the substrate 100, and the conductive electrode layer may be patterned to form the plurality of sensing electrodes 111 to 116 and the wirings 220, simultaneously.

The substrate 100 may include a transparent insulation substrate. For example, the substrate 100 may include a glass substrate, a quartz substrate, a transparent resin substrate, etc. The substrate 100 may have a predetermined flexibility. The substrate 100 may be divided into a first region I and a second region II.

In exemplary embodiments of the present invention, the conductive electrode layer may be formed by using a metal nanowire layer. The conductive electrode layer may be formed by dispersing a plurality of metal nanowires in a solution, by coating the solution on the substrate 100, and by dehydrating the solution. Therefore, the plurality of metal nanowires may be arranged to form an irregular network, and the conductive electrode layer may have a predetermined flexibility.

In exemplary embodiments of the present invention, the solution may include water, alcohols, ketones or ethers which may effectively disperse the plurality of metal nanowires, and would not corrode or oxidize the plurality of metal nanowires. The solution (e.g., solvent) may have a relatively high volatility at a temperature above about 100° C. Further, the metal nanowires may include, for example, silver (Ag) nanowires.

In exemplary embodiments, the metal nanowires may have a width of about 10 nm to about 50 nm, and may have a length of about 1 μm to about 10 μm. The metal nanowires may have a relatively large length, and may be arranged to form the network, so that the conductive electrode layer may have a relatively small electrical resistance and a relatively large light transmittance. Further, the metal nanowires may have a relatively large ductility. Accordingly, even when the touch panel is bent, the conductive electrode layer might not be broken.

In exemplary embodiments of the present invention, the plurality of sensing electrodes 111 to 116 may be arranged in a first direction D1 substantially parallel to a top surface of the substrate 100. Therefore, the plurality of sensing electrodes 111 to 116 may constitute a first sensing electrode column 110. Further, the first sensing electrode column 110, a second sensing electrode column 120 and a third sensing electrode column 130 may be arranged in a second direction D2 substantially perpendicular to the first direction D1. For example, a sensing electrode array may include a plurality of sensing electrodes arranged in the first direction D1 and the second direction D2.

A plurality of wirings 220 may be arranged to correspond to the sensing electrodes 111 and 112. The plurality of wirings 220 may extend along the first direction D1 in the first region I. In this case, the plurality of wirings 220 may have a first width W1 in the second direction D2.

The sensing electrodes 111 to 116 and the wirings 220 may be formed by the same patterning process. For example, the sensing electrodes 111 to 116 and the wirings 220 may include the same material, and may have the same top surface and the same bottom surface. In this case, a minimum width of the sensing electrodes 111 to 116 and the wirings 220 may be the first width W1. For example, the sensing electrodes 111 to 116 and the wirings 220 may be formed by a patterning process having a resolution corresponding to the first width W1.

In an exemplary embodiment of the present invention, an opposing electrode (see FIGS. 5 and 6) may be further formed on the substrate 100. For example, the opposing electrode, the sensing electrodes 111 to 116 and the wirings 220 may be formed simultaneously.

Referring to FIGS. 12 and 13, an insulation layer may be formed on the substrate 100 to cover the sensing electrodes 111 to 116 and the wirings 220, and then the insulation layer may be partially removed to form an insulation layer pattern 230.

The insulation layer may be formed by using a transparent insulating material. For example, the insulation layer may be formed using acryl-based resin or polycarbonate-based resin. In exemplary embodiments of the present invention, the insulation layer may have a thickness of about 2 µm to about 5 µm.

An etching process may be performed to form the insulation layer patterns 230. The insulation layer patterns 230 may be substantially the same as or similar to the insulation layer patterns 230 described with reference to FIGS. 2 and 3.

During the etching process, a contact hole 238 may be formed through the insulation layer patterns 230. In exemplary embodiments, the contact hole 238 may expose a portion of a top surface of the wirings 220.

Referring to FIGS. 14 and 15, electrostatic discharge patterns 240 may be formed on the insulation layer patterns 230.

Particularly, a first conductive layer and a second conductive layer may be sequentially formed to cover the sensing electrodes 111 to 116 and the wirings 220, and then the first conductive layer and the second conductive layer may be partially removed to form a first conductive pattern 242 and a second conductive pattern 244.

In exemplary embodiments of the present invention, the first conductive pattern 242 may be formed using a metal such as aluminum or copper, which may have a relatively small electrical resistance, and the second conductive pattern 244 may be formed using a metal such as titanium or nickel which may have a relatively high oxidation resistant. For example, an electrical resistance of first conductive pattern 242 is lower than an electrical resistance of the second conductive pattern 244, and an oxidation resistant of the second conductive pattern 244 is higher that an oxidation resistant of first conductive pattern 242.

Particularly, when the first conductive pattern 242 includes copper, and the second conductive pattern 244 includes titanium, the first conductive pattern 242 and the second conductive pattern 244 may have an etch selectivity with respect to the sensing electrodes 111 to 116 and the wirings 220. Therefore, the sensing electrodes 111 to 116 and the wirings 220 might not be damaged or broken down during an etching process for forming the first conductive pattern 242 and the second conductive pattern 244.

In exemplary embodiments of the present invention, the electrostatic discharge pattern 240 may have a multi layer structure including the first conductive pattern 242 and the second conductive pattern 244. The electrostatic discharge pattern 240 may have a second width W2 in the first direction D1 which is smaller than the first width W1. Therefore, the process for forming the first conductive pattern 242 and the second conductive pattern 244 may have a resolution corresponding to the second width W2. As the first conductive layer and the second conductive layer may include a metal, the first conductive layer and the second conductive layer may be easily patterned compared to the metal nanowire layer.

The foregoing is illustrative of exemplary embodiments of the present invention, and the invention should not be construed as limited to the exemplary embodiments presented herein. Modifications to the exemplary embodiments presented herein are possible without materially departing from the novel teachings and aspects of the disclosure.

What is claimed is:

1. A touch panel comprising:
   a plurality of sensing electrodes disposed on a substrate, including at least a first sensing electrode and a second sensing electrode;
   a plurality of corresponding sensing electrode wirings extending from each of the plurality of sensing electrodes, including at least a first sensing electrode wiring that is connected to no other sensing electrodes than the first sensing electrode and a second sensing electrode wiring that is connected to no other sensing electrodes than the second sensing electrode;
   an electrostatic discharge pattern electrically connected between each sensing electrode and a neighboring sensing electrode wiring of the plurality of sensing electrode wirings including being connected between the first sensing electrode wiring and the second sensing electrode, and
   an insulation layer pattern disposed between the electrostatic discharge pattern and the sensing electrodes,
   wherein the electrostatic discharge pattern electrically connects each sensing electrode and its neighboring sensing electrode wiring though a contact hole penetrating the insulation layer pattern.

2. The touch panel of claim 1, wherein the electrostatic discharge pattern includes a first end portion directly contacting the sensing electrode wirings and a second end portion overlapping the sensing electrodes.

3. The touch panel of claim 2, wherein the second end portion of the electrostatic discharge pattern is separated from the sensing electrode wirings or the sensing electrodes.

4. The touch panel of claim 1, wherein the electrostatic discharge pattern is disposed adjacent to a portion where the sensing electrodes directly contact the sensing electrode wirings.

5. The touch panel of claim 1, wherein the plurality of sensing electrodes includes multiple columns of sensing electrodes and a distance between the electrostatic discharge pattern and an upper edge of the sensing electrode is different for each of the multiple columns of the sensing electrodes.

6. The touch panel of claim 1, wherein the sensing electrodes and the sensing electrode wirings include a plurality of metal nanowires, and the electrostatic discharge pattern includes a first conductive pattern and a second conductive pattern which are stacked sequentially.

7. The touch panel of claim 6, wherein the sensing electrodes and the sensing electrode wirings include a plurality of silver (Ag) nanowires, an electrical resistance of the first conductive pattern is lower than an electrical resistance of the second conductive pattern, and an oxidation resistant of the second conductive pattern is higher that an oxidation resistant of the first conductive pattern.

8. The touch panel of claim 6, wherein the first conductive pattern includes copper (Cu), and the second conductive pattern includes titanium (Ti).

9. The touch panel of claim 1, wherein each of the plurality of sensing electrode wirings has a first width, the electrostatic discharge pattern has a second width, and the second width is smaller than the first width.

10. The touch panel of claim 1, wherein the substrate includes a first region and a second region surrounding at least one side of the first region, and the sensing electrodes are disposed in the first region.

11. The touch panel of claim 10, wherein each of the plurality of sensing electrode wirings is disposed in the first region and the second region, each of the plurality of sensing electrode wirings has a first width in the first region, the electrostatic discharge pattern has a second width, and each of the sensing electrode wirings has a third width in the second region, and
wherein the first width is smaller than the third width and the second width is smaller than the first width.

12. The touch panel of claim 10, further comprising a pad portion disposed in the second region, and the second region surrounds one side of the first region.

13. The touch panel of claim 10, wherein the sensing electrodes are arranged in a first direction and a second direction that is parallel to a top surface of the substrate, and each of the sensing electrode wirings extends along the first direction in the first region.

14. The touch panel of claim 13, further comprising an opposing electrode disposed on the substrate, wherein the opposing electrode has a planar shape such that the opposing electrode does not overlap the sensing electrodes.

15. The touch panel of claim 14, wherein the opposing electrode extends in the first direction, and a plurality of sensing electrodes corresponds to single opposing electrode.

16. The touch panel of claim 14, wherein a top surface and a bottom surface of the opposing electrode have the same height as a top surface and a bottom surface of the sensing electrode.

17. The touch panel of claim 10, wherein the sensing electrodes are arranged in a first direction and a second direction that is parallel to a top surface of the substrate, and each of the sensing electrode wirings extends along an oblique direction inclined with respect to the first direction in the first region.

18. The touch panel of claim 1, wherein a plurality of electrostatic discharge patterns corresponds to each single wiring of the plurality of sensing electrode wirings.

19. The touch panel of claim 1, wherein each of the plurality of sensing electrodes is connected in parallel.

20. A method of manufacturing a touch panel, the method comprising:
    forming a plurality of sensing electrodes and a plurality of sensing electrode wirings on a substrate, each of the plurality of sensing electrode wirings extending from a corresponding sensing electrode of the plurality of sensing electrodes;
    forming an insulation layer pattern partially overlapping the plurality of sensing electrodes and the plurality of sensing electrode wirings; and
    forming an electrostatic discharge pattern on the insulation layer pattern, the electrostatic discharge pattern connecting each of the plurality of sensing electrodes with a neighboring sensing electrode wiring of the plurality of sensing electrode wirings through a contact hole penetrating the insulation layer pattern,
    wherein forming the electrostatic discharge pattern includes:
    sequentially forming a first conductive layer and a second conductive layer, the first conductive layer and the second conductive layer covering the sensing electrodes and the sensing electrode wirings; and
    partially removing the first conductive layer and the second conductive layer to form a first conductive pattern and a second conductive pattern,
    wherein the first conductive layer and the second conductive layer each have an etch selectivity with respect to the sensing electrodes and the sensing electrode wirings.

21. The method of claim 20, wherein forming the sensing electrodes and the sensing electrode wirings includes forming an opposing electrode at substantially the same time as the forming of the sensing electrodes, the opposing electrode having a planar shape such that the opposing electrode does not overlap the sensing electrodes.

22. A touch panel, comprising:
    a first sensing electrode disposed on a substrate and connected to a pad portion of the substrate by a first wiring that is connected to no other sensing electrodes but the first sensing electrode;
    a second sensing electrode disposed on the substrate and connected to the pad portion of the substrate by a second wiring that is connected to no other sensing electrodes but the second sensing electrode;
    a first bridge metal extending from the first wiring to the second sensing electrode;
    a first insulating pattern insulating the first bridge metal from the second sensing electrode;
    a third sensing electrode disposed on the substrate and connected to the pad portion of the substrate by a third wiring that is connected to no other sensing electrodes but the third sensing electrode;
    a second bridge metal extending from the second wiring to the third sensing electrode; and
    a second insulating pattern insulating the second bridge metal from the third sensing electrode.

23. The touch panel of claim 22, further including:
    a fourth sensing electrode disposed on the substrate and connected to the pad portion of the substrate by a fourth wiring that is connected to no other sensing electrodes but the fourth sensing electrode;
    a third bridge metal extending from the third wiring to the fourth sensing electrode; and
    a third insulating pattern insulating the third bridge metal from the fourth sensing electrode.

24. The touch panel of claim 22, wherein the first and second bridge metals are electrostatic discharge patterns.

* * * * *